(12) United States Patent
Gura (10) Patent No.: US 7,996,266 B2
(45) Date of Patent: Aug. 9, 2011

(54) METHOD FOR PRESENTING VISUAL ASSETS FOR SALE, USING SEARCH ENGINES

(75) Inventor: Eyal Gura, Haifa (IL)

(73) Assignee: Piscout Ltd, Herziya (IL)

( * ) Notice: Subject to any disclaimer, the term of this patent is extended or adjusted under 35 U.S.C. 154(b) by 373 days.

(21) Appl. No.: 11/628,820

(22) PCT Filed: Jun. 6, 2005

(86) PCT No.: PCT/IL2005/000597
§ 371 (c)(1),
(2), (4) Date: May 30, 2008

(87) PCT Pub. No.: WO2005/120163
PCT Pub. Date: Dec. 22, 2005

(65) Prior Publication Data
US 2008/0249891 A1    Oct. 9, 2008

(30) Foreign Application Priority Data

Jun. 8, 2004    (IL) .......................................... 162411

(51) Int. Cl.
*G06Q 30/00*    (2006.01)
(52) U.S. Cl. ........................................................ 705/26
(58) Field of Classification Search ................... 705/26, 705/27
See application file for complete search history.

(56) References Cited

U.S. PATENT DOCUMENTS

| | | | |
|---|---|---|---|
| 5,761,655 A | 6/1998 | Hoffman | |
| 5,911,139 A | 6/1999 | Jain et al. | |
| 6,011,537 A | 1/2000 | Slotznick et al. | |
| 6,278,992 B1 | 8/2001 | Curtis et al. | |
| 6,535,888 B1 | 3/2003 | Vijayan et al. | |
| 6,725,259 B1 | 4/2004 | Bharat | |
| 2004/0015408 A1* | 1/2004 | Rauen et al. ..................... 705/26 |
| 2004/0122811 A1* | 6/2004 | Page ................................ 707/3 |
| 2005/0154737 A1* | 7/2005 | O'Donnell ....................... 707/10 |
| 2006/0044599 A1* | 3/2006 | Lipowitz et al. ............. 358/1.15 |
| 2008/0249891 A1 | 10/2008 | Gura | |

(Continued)

FOREIGN PATENT DOCUMENTS

WO    WO 2004/046982    6/2004

OTHER PUBLICATIONS

Alvarez, Using Extended File Information (EXIF) File Headers in Digital Evidence Analysis; International Journal of Digital Evidence, Winter 2004, vol. 2, Issue 3.

(Continued)

*Primary Examiner* — Mila Airapetian (74) *Attorney, Agent, or Firm* — Perkins Coie LLP (57) ABSTRACT

The present invention relates to a method for causing purchasable visual assets that can otherwise be accessed only by the visual assets provider' proprietary search engine, to appear within the result lists of public search engines, comprising: providing for each of said purchasable visual assets web page which includes at least the following: (a)—a representation image of said purchasable asset; (b) textual description best describing the content of said purchasable visual asset; (c) indication within said page or representation image for indicating that the asset is purchasable; and (d) a link to said stock library where the purchasable visual asset is sold.

7 Claims, 5 Drawing Sheets

(5 of 5 Drawing Sheet(s) Filed in Color)

U.S. PATENT DOCUMENTS

2008/0256068 A1 * 10/2008 Ma et al. .................. 707/5
2008/0289023 A1 * 11/2008 Wardrop .................. 726/9

OTHER PUBLICATIONS

International Search Report Dated Nov. 27, 2006 From the International Searching Authority Re.: Application No. PCT/IL05/00597.

Office Action Dated Dec. 7, 2008 From the Israeli Patent Office Re.: Application No. 162411.

Written Opinion Dated Nov. 27, 2006 From the International Searching Authority Re.: Application No. PCT/IL05/00597.

Office Action Dated Nov. 11, 2009 From the Israel Patent Office Re.: Application No. 162411 and Its Translation Into English.

Alvarez "Using Extended File Information (EXIF) File Headers in Digital Evidence Analysis", International Journal of Digital Evidence, 2(3): 1-5, Winter 2004.

* cited by examiner

METHOD FOR PRESENTING VISUAL ASSETS FOR SALE, USING SEARCH ENGINES

FIELD OF THE INVENTION

The present invention relates to the field of ranking of image search results. More particularly, the invention relates to a method for presenting multimedia assets, which are for sale using common search engines.

BACKGROUND OF THE INVENTION

The Internet provides a convenient way of allowing people to search and purchase licenses for using selected media data, such as digital images, video clips audio files etc. Today, there are several digitally enabled image agencies and stock libraries which specialize in the retrieval and sale of images via the Internet, such as Corbis®, Getty Images (1996-2004 Getty Images, Inc.), Comstock (2004 Comstock Images, LLC, a wholly-owned subsidiary of Jupitermedia Corporation) and the like. Users who wish to buy digital images or licenses to use such digital images, are normally required to look in one or more agencies and accurately facilitate the retrieval of media data via such image agencies, by performing a search on the media classification systems developed and maintained by the agencies themselves and in their related databases. This can prove problematic, as the number of specializing visual assets agencies increase, and therefore most of those agencies are not known to the user, and particularly in view of the fact that the amount of media data available through thee agencies databases is not reachable via public search engines, such as Google™, Yahoo!® and the like.

Search engines algorithms such as Google™, Yahoo!®, MSN of Microsoft Corporation, etc., perform continuous indexing of billions of web pages (including their text, images, and other data types) by means of crawler/spider software. Usually, it is used to locate HTML pages or other types of pages by their content or by following hypertext links from one page to another. Said algorithms are used to find new Web pages, that are then summarized and indexed.

The web pages are indexed according to several ranking mechanisms that vary between the search engines. In general, each web page is indexed according to its text elements, the links to other sites, the URL and other parameters. The sophisticated algorithms of the search engines rank each web page according to "popularity" measurements such as relevant links and hits to the URL, the context of the web page, the files included within it, and more.

Figure 1:
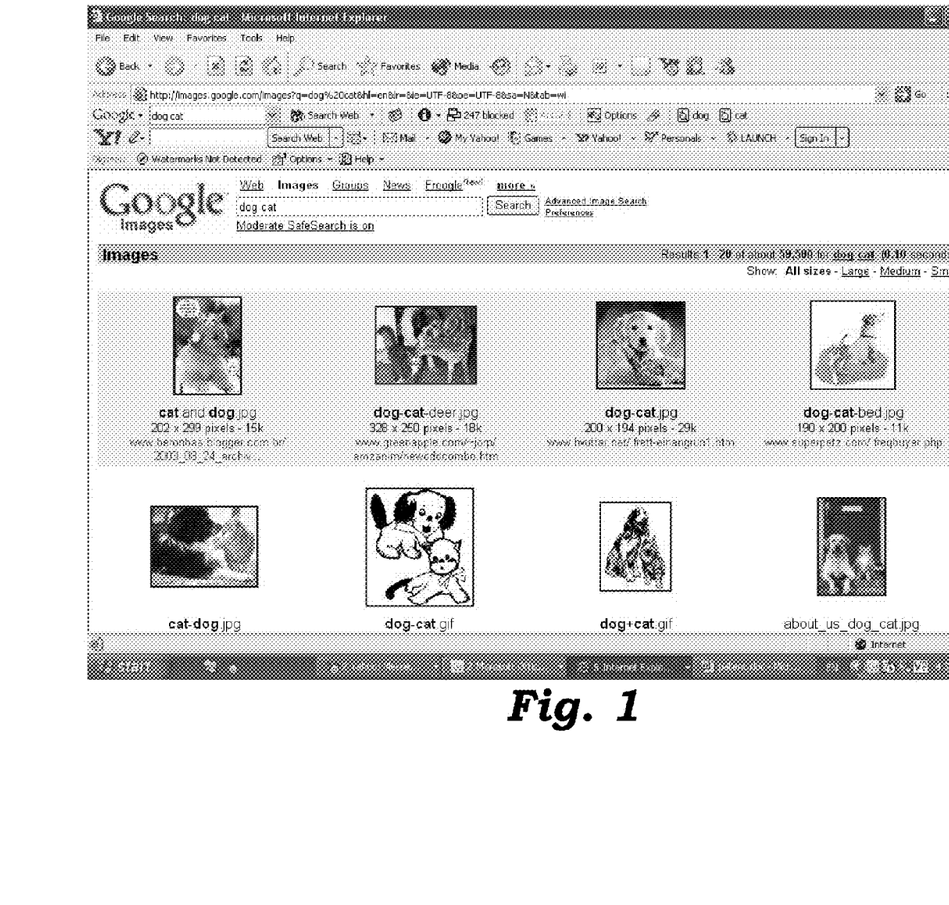
FIG. 1 shows a typical image gallery of a search engine displaying the retrieved images of a search result.
Figure 2:
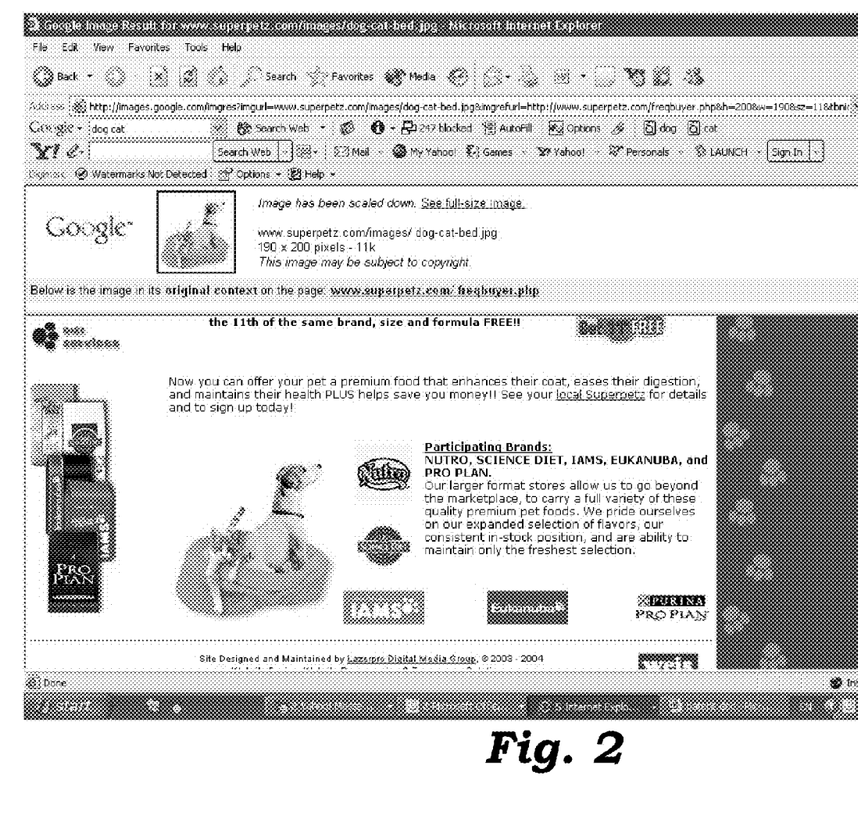
FIG. 2 shows a typical, second level preview page of a selected image from the retrieved images of the image gallery of FIG. 1.

Some of the search engines provide image galleries section (for example, "Google images" link, see FIG. 1), which enables the search engine users to retrieve images. Some of those search engines also provide a second level interface of the said image section (see FIG. 2), that contains the images that were obtained from the indexed web sites and URLs. As explained above, the images, in some similarity to the text indexing, are also indexed according to their file type/name/size and the text that appears around them in the web page. This enables a user to retrieve images in the same manner as people search for text. While a search for the terms "dog AND cat" in the main search box will provide URLs that contain text and/or information about dogs and cats, searching by the image section of the search engine interface (e.g., Google™ Images or Yahoo! Images) will retrieve the images that are associated with Dog/Cat according to the file name and/or text and/or the meta-tag that appear close to the image (e.g., see FIGS. 1 and 2).

The public search engines galleries contain billions of images (e.g., as of April 2005 Google™ alone contains about 1.2 billion images). These images hereinafter "visual assets") are the property of their owners and appear in various WWW sites. Some search engines also support many languages, and may also suggest corrections and alternatives to a misspelled text or query. This is an additional advantage of the use public search engine galleries over the stock image libraries internal engines. Typically, in a public gallery, when a user clicks on an image, a preview page of a second level interface (see FIG. 2), is opened. In addition to the image thumbnail, the user can see the user can see the preview of the web page in which the image appears. Usually, the user can then link to the target page.

Search Engines Optimizers (SEO) are dedicated software/systems/methods that aid to increase the rank of a URL within search engine search results. Most of the new visitors to each specific website access that website following the use of a search engine. For example, it is known in the art that for business practices, the higher ranked the URL is in the search results, the higher the expected traffic is to the web site is, and the higher the probability is to make a business transaction. There are several ways to cause web pages to become efficiently indexed and relatively highly ranked by a third party search engine algorithm, as described in U.S. Pat. No. 6,278,992 and U.S. Pat. No. 6,725,259.

There are users who wish to buy visual assets such as stock photography, cliparts, illustrations and others, in particular the Art buyer's population (e.g., advertisers, publishers, designers, etc.). As said, one of the methods to get the visual file is to buy it from a dedicated stock library (such as Corbis, Gettyimages and others).

As their way of doing busyness, the stock libraries or agencies produce a digital file and define it by keywords, so it can be retrieved from its database and be purchased. Even though some of the stock agencies are selling via the web and have a very high trafficked web site, the images are retrieved from the internal database and therefore do not appear in the public search engines' image gallery (e.g., Google Images). Therefore, a user who wishes to buy a visual asset must search in each agency database, and, if he does not find a desired image, he must try to search for it in another agency or image source. Therefore, a search for an image can be tedious and annoying, and may take a relatively long period of time and much effort.

Due to lack of a centralized place for presenting all the purchasable visual assets, and the increasing massive attraction of the public search engines, the art buyers may tend to try to perform a keyword search in the public search engine galleries first. In that case, when the art buyer finds a desired image in the public gallery, he has to locate the image owner in order to negotiate pricing. In many cases, the images retrieved by the public search engines are not for sale, or the owner identity is unknown. Therefore, the art buyer needs to continue searching for another image, or to try to continue spending time in order to locate the owner of the desired image. In other cases, lack of ability to contact the image owner, increases the tendency to download the image file from the public image gallery, or from the web site in which the image is found, while violating copyrights. The art described so far have not yet provided a satisfactory solution to the problem of retrieving visual assets for purchase via public search engines. The present invention will provide the user with the ability to identify purchasable images from many image sources, and with friendly retrieval options such as multi language search and spelling engine.

It is an object of the present invention to provide a method enabling the user to search and purchase visual assets via familiar search processes and tools such as public search engines.

It is another object of the present invention to enable the user to easily identify those purchasable visual assets within the results of public galleries search engines image sections.

Other objects and advantages of the invention will become apparent as the description proceeds.

SUMMARY OF THE INVENTION

Method for causing purchasable visual assets that can otherwise be accessed only by the visual assets provider' proprietary search engine, to appear within the result lists of public search engines, comprising: (a) providing for each of said purchasable visual assets web page which includes at least the following: (a1) a representation image of said purchasable asset; (a2) textual description best describing the content of said purchasable visual asset; (a3) indication within said page or representation image for indicating that the asset is purchasable; and (a4) a link to said stock library where the purchasable visual asset is sold.

Preferably, said purchasable assets are purchasable visual assets of stock libraries, and wherein the dedicated search engine is a proprietary search engine of the stock library operator.

Preferably, the web page is formed such as to be efficiently found and relatively highly ranked by public search engines.

Preferably, said textual description of each purchasable asset includes keywords that are most expected to be used by one searching such purchasable asset.

Preferably, the representation image which is included within said web page is of lower resolution or quality than the original, purchasable asset.

Preferably, the indication is a visual indication appearing within said representation image.

Preferably, the indication is an audible indication.

Preferably, the method further comprises the providing at the user end within the public search engine interface a filter for including only purchasable objects within the results list.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

In this application, the words "image" and "visual asset" are used interchangeably to designate a media file represented in digital format. The terms "dedicated search engine" or "proprietary search engine" refer to a search engine which is operated by the purchasable visual assets provider.

The invention will now be described primarily with reference to the examples of purchasable digital images. These examples are provided merely to illustrate the invention and are not intended to limit its scope in any way. It should be understood that the invention can be applied mutatis mutandis to other media types such as audio files, video files, etc.

All the media files used in this invention are digital media files. For example, each digital image is preferably, but not limitatively, an array of pixels.

Figure 3:
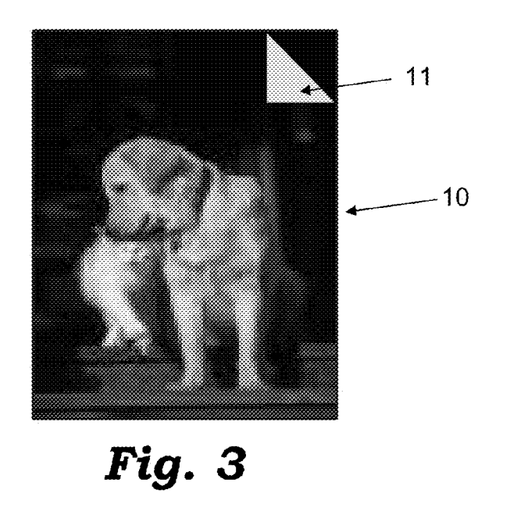
FIG. 3 shows a marked image, according to a preferred embodiment of the present invention.

The present invention relates to a method of presenting purchasable visual assets in public search engines image galleries and providing a linkage from the search engine image gallery to the image owner or seller. As said, public search engines algorithms tend not to index images from stock libraries internal data bases. The public search engines algorithms do, however, index images from HTML web pages or other publicly available pages. According to a preferred embodiment of the present invention, a web page is generated for each visual asset file in a way it will be efficiently indexed and relatively highly ranked by a public search engine algorithm. Furthermore, according to the present invention each visual asset file is clearly digitally marked as a purchasable media file. It should be noted that currently used methods of water markings or copy right notifications (©) do not necessarily indicate purchasability. In one embodiment of the invention, the digital file becomes a part of a specially built web page that includes a text with the file context description. Preferably, but not limitatively, the said digital marking of the visual asset can be one or more keywords and/or other suitable data indicating that the visual asset is a purchasable one. For example, the marking can be data representing a displayable indicator(s) visually indicating to the user that the viewed visual asset is a purchasable one. FIG. 3 shows an image 10 for purchase marked with a visual indicator 11 at the upper right corner of the image. This image, hereinafter also referred to as a "representative image", may be of lower quality than of the original visual asset.

Figure 4:
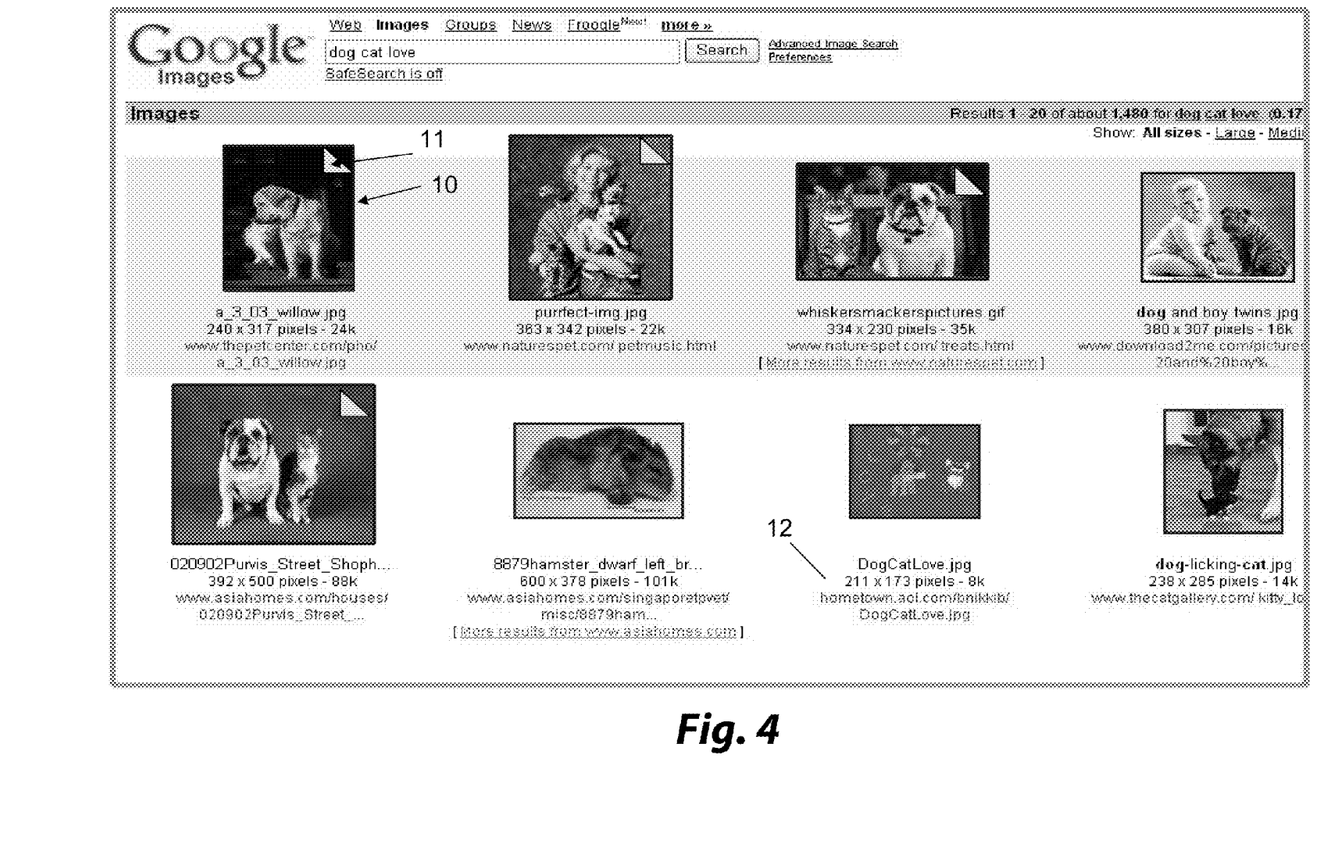
FIG. 4 shows the typical image gallery of FIG. 1 displaying the images of the search result including the marked images for purchase, according to a preferred embodiment of the present invention.
Figure 5:
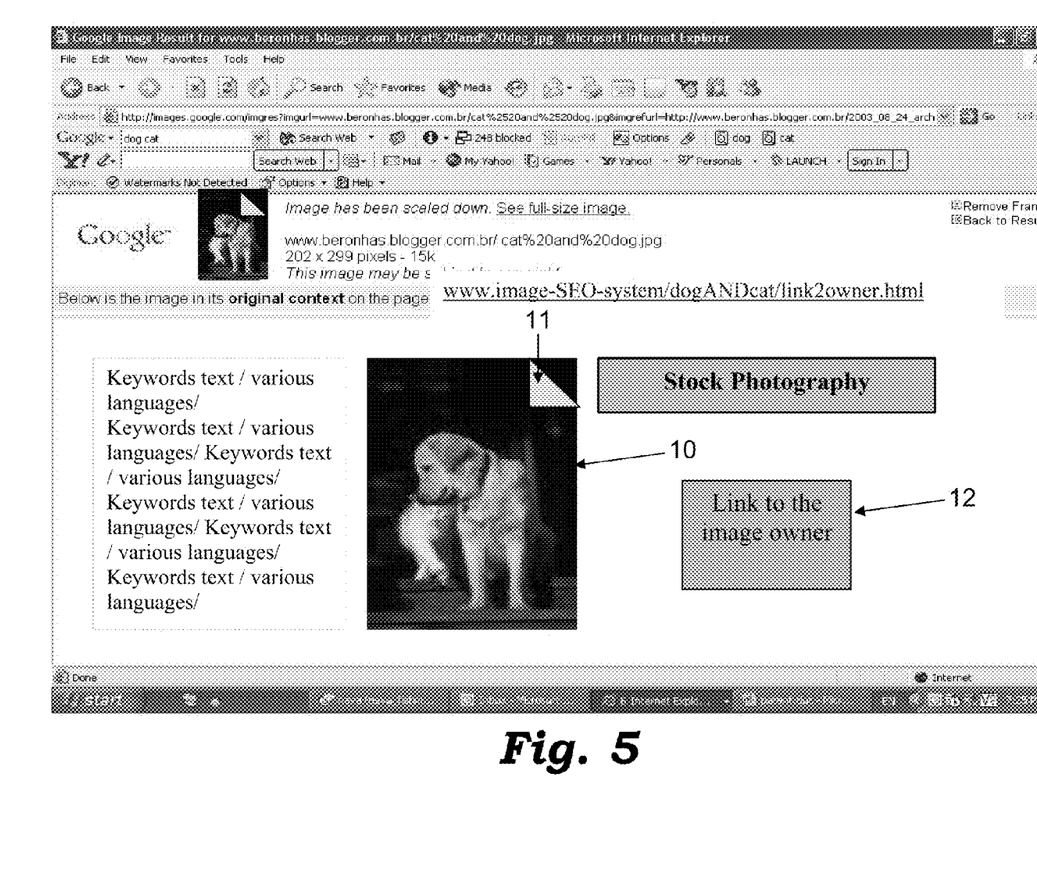
FIG. 5 shows the preview page of the image gallery of FIG. 4, provided with means for allowing the purchase of the image, according to a preferred embodiment of the present invention.

According to the present invention, due to the fact that the purchasable visual assets are marked, preferably—but not limitatively, with a visual mark, the user who performs the search can easily distinguish which of the represented images (see FIG. 4 in which indication 11 of the representative images indicates purchasable assets), which are usually displayed in thumbnails form, are for purchase, and which are not. In public search engines, such as Google™, each retrieved image has a second level preview page displaying further details and/or larger viewable size of the representative image 10, as shown in FIG. 5. According to an embodiment of the invention, the said preview page of each marked visual asset provides a link 12 to the image owner or to other information enabling the user to purchase a license to use the selected image.

In a preferred embodiment of the invention, each web page is dedicated to one or more specific visual assets in order to promote these specific images in the resulted list of images of the public search engines. Each image is described or associated with a relevant textual description, and dedicated keywords. Preferably, each image is described in more than one language, in the file name and in the web page context, thereby enabling more users, speaking different languages, to retrieve, and therefore access such images. The generated web pages relating to purchasable assets include relevant meta-tags and other textual elements that point to the image context. Furthermore, the generated web page may also include a linking mechanism to other similar images or image providers and/or others techniques that are used by Search Engines Optimizers (SEO) that may increase the page ranking and therefore the image ranking in the image gallery of the search engine. Another method is to provide access to these pages directly by the search engines companies.

The said image pages relating to the purchasable images will then be crawled by the public search engines, and be indexed in a conventional manner.

According to still another embodiment of the present invention, the search engine is provided with a filter enabling retrieving only marked (purchasable) data files as the result of a given search query. For example, the filter can be a dedicated "button" in the image gallery of the search engine, or an additional image gallery in the search engine dedicated to purchasable visual assets, etc. Preferably, the filter is provided to the search engine by suitable software means or suitable application, as is known by a person skilled in the art.

The present invention allows art buyers to search and retrieve visual assets by using common keywording practices in their language or other languages. For example, when the art buyer will search for a "dog AND cat" image, he will get to see the same Image Gallery of its favorite search engine, with the difference that the appeared images (or at least some of them) will be marked as purchasable, and linked to the image owner/owner web site/Stock library web site/other.

It should be noted that unlike other purchasable products via the Internet (e.g., electronics appliance, books, drugs etc.) the essential of the image is in the displayed image itself. Therefore, in many cases the buying decision will be made according to the image view rather than some regular product parameters such as capacities/specifications/pricing. Therefore, whenever the term "visual assets for sale" is mentioned throughout this application, it is also refer to "visual sale of assets", for example, decorative products which the buying decision may be made mainly upon the product look or view.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. Method for causing stock libraries copyrighted visual assets, said copyrighted visual assets comprising images, that can otherwise be accessed for obtaining licensing solely by dedicated search engines of said stock libraries, to appear within the result lists of public search engines, while said copyrighted assets, when appearing in said public search engine results lists, are further distinguished as such from non-copyrighted visual assets, the method comprising:
    creating for each of said copyrighted visual assets of a stock library a web page, the web page being distinct from the respective copyrighted visual asset, which web page includes at least the following:
        a representation image of said copyrighted asset;
        textual description best describing the content of said copyrighted visual asset;
        indication within said page or representation image for indicating that the asset is copyrighted and is offered for licensing; and
        a link to said stock library where the copyrighted visual asset is offered for licensing, the link being to obtain said licensing; and
    making said web page available to public search engines such that said web page is included on results lists of search queries to which said respective copyright visual asset is deemed relevant by said public search engine, thereby rendering images of said stock library available individually through querying said public search engine as copyrighted visual assets.

2. The method of claim 1, wherein the web page is formed such as to be efficiently found and relatively highly ranked by the public search engines.

3. The method of claim 1, wherein said textual description of each copyrighted asset includes keywords that are most expected to be used by one searching such visual asset using said public search engine.

4. The method of claim 1, wherein the representation image which is included within said web page is of lower resolution or quality than of the original, copyrighted asset.

5. The method of claim 1, wherein the indication is a visual indication appearing within said representation image.

6. The method of claim 1, wherein the indication is an audible indication.

7. The method of claim 1, further comprising providing at the user end within the public search engine interface a filter for including only stock libraries copyrighted objects, as found, within the results list.

* * * * *

UNITED STATES PATENT AND TRADEMARK OFFICE
CERTIFICATE OF CORRECTION

PATENT NO. : 7,996,266 B2  Page 1 of 1
APPLICATION NO. : 11/628820
DATED : August 9, 2011
INVENTOR(S) : Eyal Gura It is certified that error appears in the above-identified patent and that said Letters Patent is hereby corrected as shown below:

On the Title page, in field (73), in column 1, in "Assignee", line 1, delete "Piscout" and insert -- Picscout --, therefor.

On the Title page, in field (73), in column 1, in "Assignee", line 1, delete "Herziya" and insert -- Herzliya --, therefor.

On the Title page, in field (57), in column 2, in "Abstract", line 6, delete "(a)-a" and insert -- (a) a --, therefor.

In column 2, line 3, delete "hereinafter" and insert -- (hereinafter --, therefor.

In column 2, line 12, before "the preview" delete "the user can see".

In column 5, line 46, after "products" insert -- for --.

Signed and Sealed this
Third Day of January, 2012

David J. Kappos
*Director of the United States Patent and Trademark Office*